(12) United States Patent
Lukas et al.

(10) Patent No.: US 8,808,579 B2
(45) Date of Patent: Aug. 19, 2014

(54) METHOD FOR PRODUCING A DISPERSION OF NANOPARTICLES

(75) Inventors: Simon Lukas, Hersbruck (DE); Michael Jank, Erlangen (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 282 days.

(21) Appl. No.: 13/207,592

(22) Filed: Aug. 11, 2011

(65) Prior Publication Data

US 2012/0037856 A1 Feb. 16, 2012

(30) Foreign Application Priority Data

Aug. 13, 2010 (DE) .................. 10 2010 034 293

(51) Int. Cl.
| | | |
|---|---|---|
| *H01B 1/00* | (2006.01) | |
| *B22F 9/24* | (2006.01) | |
| *B22F 1/00* | (2006.01) | |
| *B82Y 30/00* | (2011.01) | |

(52) U.S. Cl.
CPC ............... *B22F 1/0022* (2013.01); *B22F 9/24* (2013.01); *B82Y 30/00* (2013.01)
USPC .......................................... 252/500; 428/403

(58) Field of Classification Search
USPC ........................... 252/500; 428/403; 475/370
See application file for complete search history.

(56) References Cited

U.S. PATENT DOCUMENTS

| | | | |
|---|---|---|---|
| 2002/0194958 A1* | 12/2002 | Lee et al. ........................ | 75/370 |
| 2008/0063855 A1 | 3/2008 | Kelman et al. | |
| 2008/0090082 A1* | 4/2008 | Shim et al. .................... | 428/403 |

FOREIGN PATENT DOCUMENTS

| | | | |
|---|---|---|---|
| DE | 10 2006 024490 A1 | 11/2007 | |
| EP | 2 067 743 A1 | 6/2009 | |
| WO | WO 2009/125370 A1 | 10/2009 | |

* cited by examiner

*Primary Examiner* — Khanh Tuan Nguyen
(74) *Attorney, Agent, or Firm* — Leydig, Voit & Mayer, Ltd.

(57) ABSTRACT

The invention relates to a method for producing a dispersion of nanoparticles having an essentially oxide-free surface in a liquid phase, a two-phase system being used. The invention relates furthermore to the dispersion produced with this method.

20 Claims, No Drawings

METHOD FOR PRODUCING A DISPERSION OF NANOPARTICLES

CROSS-REFERENCE TO A RELATED APPLICATION

This application claims the benefit of German Patent Application Serial No. DE 10 2010 034 293.9, filed Aug. 13, 2010, the disclosure of which is incorporated herein by reference.

BACKGROUND OF THE INVENTION

The invention relates to a method for producing a dispersion of nanoparticles having an essentially oxide-free surface in a liquid phase, a two-phase system being used. The invention relates furthermore to the dispersion produced with this method.

For liquid-processed electronic components based on the use of dispersed nanoparticles ("inks"), it is necessary that these particles have a defined and known surface quality. Thus, for example the presence of a surface oxide layer on a metallic or semiconducting nanoparticle significantly increases the electrical resistance of the normally conducting or semiconducting thin films produced therefrom in electronic components and reduces the efficiency of these components or prevents their function entirely. Likewise, subsequent processes of the films, such as e.g. sintering, are impeded by the oxide shell. As a result of the high specific surface, degradation of the surface in air or in water is effected too rapidly to be able to further process the particles produced initially with a defined surface which is free of disruptive atoms without changing the surface.

Various methods for resolving this problem previously have now become known from the state of the art.

Thus US 2008/0063855 A1 describes storage of nanoparticles under an inert gas atmosphere, such as e.g. nitrogen, argon or the like, in a closed environment, such as e.g. a glove box. With this method, it is however disadvantageous that high expenditure on equipment is required for this purpose and, due to contamination of the inert gas atmosphere with oxygen or water, a susceptibility to faults cannot be avoided. In the case of the method described in the above-mentioned US patent, it is also disadvantageous that this cannot be achieved economically.

In WO 2009/125370 A1, an in situ reduction of oxidised particles during production is described. One possibility for this is grinding of bulk material. By adding a liquid reducing agent during grinding or alternatively by a suitable chemical property of the mill alloy, the particles are freed of oxide directly during their production or the formation of oxide is suppressed. However, it is unfavourable with this described process that the structural properties (crystallinity, size distribution) of the ground particles is greatly non-homogeneous, these then in turn having a disadvantageous effect on the film formation or printability and also the electrical properties resulting therefrom.

Furthermore, a method is known from EP 2 067 743 A1, in which an organic functionalisation of an oxide-free particle surface is undertaken by bonding a monolayer of organic molecules covalently to this surface. It must be mentioned as a disadvantage in this method that the organic monolayer impairs the electrical properties of the thin films produced from the particles and that it is also not ensured that the oxidation is necessarily prevented.

Finally, etching of the surface oxide of silicon nanoparticles by means of an acid in dispersion of a polar solvent or also alternatively by etching the particle shells in the already deposited film after evaporation of the solvent is known from DE 10 2006 024 490 A1. It is disadvantageous with this method that the process demands precise control of the etching rate by means of the concentration of the acid and also etching duration in order to avoid over- or under-etching. In the case of etching in dispersion, the process is restricted to polar solvents, such as e.g. water or alcohols, in order to dissolve the acid. Disadvantages result therefrom for the stability of the dispersion (potential segregation, reoxidation in the case of too low an acid concentration, restriction for printing process; preference for organic solvents which are easy to evaporate and less polar). Since the acid is still present on the deposited film during processing, a potential contamination source or a risk with respect to operating safety is hence provided.

BRIEF SUMMARY OF THE INVENTION

Starting herefrom, it is therefore the object of the present invention to propose a method for producing a dispersion of nanoparticles having an essentially oxide-free surface, which is characterised in that nanoparticles can be provided in a dispersion, which have a surface which is as oxide-free as possible and which can hence be processed then without difficulty and without contamination in further process steps. Furthermore, it is an object of the present invention to propose a corresponding dispersion with nanoparticles having an essentially oxide-free surface.

This object is achieved with respect to the method by the characterising features of patent claim 1 and, with respect to the dispersion, by the features of patent claim 14. The further dependent claims reveal further advantageous developments.

DETAILED DESCRIPTION OF THE INVENTION

According to the invention, it is hence proposed to provide at least one two-phase system comprising a first liquid phase (start phase) and a second liquid phase which is not miscible with the start phase (target phase). The start phase and target phase is thereby chosen such that these form a dispersion after adding nanoparticles having an at least partially oxidic surface as a function of the oxidation state of the surface in the start phase and/or the start- and target phase. By addition of a reducing agent which dissolves in the start phase, the nanoparticles having the at least partially oxidic surface on the surface thereof are then reduced and then dispersed in the target phase.

The invention hence exploits the different dispersibility of nanoparticles in different solvents as a function of the surface property of the particles. The method according to the invention thereby has the following crucial advantages:

1) The process is independent of the actual relationship of start- to target property of the surface. Particles which already have the target surface preferably disperse immediately in the target phase. Particles having the undesired surface disperse in the same phase as the reducing agent and are modified there. Hence, the requirement for storage under inert conditions before the dispersion is dispensed with, for example in the case of readily oxidisable particles.

2) The dispersion in the target phase is effected in situ after the surface reaction, i.e. there is no contact with air (even without expenditure on equipment for maintenance of an inert atmosphere).

3) The process is self-adjusting: the particles only change after successful reaction in the target phase (exclusion of inadequate etching). Since in the target phase there is no reducing agent, there is no problem of over-etching.

4) As the reducing agent does not dissolve in the target phase, there is only a small risk of contamination.

5) The two-phase system is self-conserving: should the result be degradation/back reaction in the target phase, e.g. by diffusion of oxygen or the presence of impurities, the particle will reach the phase interface by diffusion, will react there again and again be received in the target phase.

6) Because of the low equipment requirements and volume independence of the process, this can be scaled easily to an industrial scale.

In the case of the method according to the invention, it is not thereby absolutely necessary that the method steps a), b) and c), indicated in patent claim 1, are implemented in succession. The sequence of the steps is arbitrary. Thus, the two-phase system can be provided first and then the addition of the nanoparticles can be effected and, in a next step, the reducing agent can then be added. The method according to the invention also includes embodiments in which firstly the particles are present and then the reducing agent dissolved in the start phase is added, finally the target phase is then added.

Alternatively, the reducing agent can be contained partially also even in the start phase.

The method according to the invention is basically not restricted to one specific sort of nanoparticles. All nanoparticles known in the state of the art can be used. Examples of nanoparticles are nanoparticles of the elements silicon, germanium, aluminium, gallium, indium, copper, silver, gold, titanium, zinc, iron, cobalt, nickel, palladium, platinum or nanoparticles of compounds or alloys which comprise at least one of these elements. Silicon is preferred in the case of the nanoparticles.

The nanoparticles can thereby have an average diameter of 2 nm to 5 µm.

Of course it is irrelevant in the case of the method according to the invention whether the nanoparticles used have an at least partially oxidic surface which was already present and/ or whether this was produced artificially.

With respect to the material selection of the two liquid phases, i.e. the start phase and also the target phase, the invention is subject to no restrictions, with the proviso that the two phases, i.e. the start phase and the target phase, must not be miscible with each other. The start phase can therefore be selected e.g. from water, an aqueous phase but also from an organic solvent. The target phase is selected for example from an organic solvent, but also, provided that the start phase is an organic solvent, water or an aqueous solvent.

In the case of the organic solvents there may be mentioned halogen alkanes, such as chloroform or tetrachloromethane, furthermore long-chain linear or branched alcohols. Examples of these are 1-butanol, 2-ethyl-1-hexanol or 1-octanol.

The reducing agent provided according to the invention is preferably an acid or a base, dependent upon the choice of nanoparticles. In the case of an acid, this is preferably a hydrofluoric acid, a hexafluorosilicic acid or a hydrochloric acid. With respect to bases there may be mentioned potassium hydroxide solutions and sodium hydroxide solutions.

Of course, the invention also comprises mixtures of the previously mentioned reducing agents.

In order that the method according to the invention is effected in a reasonable time frame, it is preferred to mix the two-phase system thoroughly. Basically, all methods can be applied here which lead to thorough mixing of a two-phase system. There may be mentioned hereby by way of example mixing by shaking, ultrasound, agitation or also thorough mixing by heating and/or conducting through liquids or gases. Also a fluidic or microfluidic mixing by flows is possible.

It is also possible in addition also to heat the two-phase system or to subject the two-phase system to radiation, ultrasound or electrical fields.

The invention comprises furthermore also a dispersion of nanoparticles having an essentially oxide-free surface in a liquid phase which can be produced according to the above-described process.

The dispersion according to the invention can be used after separation of the start phase and removal of the solvent of the target phase, e.g. by producing liquid-processed electronic components. Examples of such components are transistors, resistors, strip conductors, capacitors, coils, diodes, solar cells, detectors, memory cells or sensors. The dispersion can also be used for gas-liquid processes, such as the gas-liquid aerosol process (e.g. airbrush process).

Surprisingly, it could be established that the dispersions according to the invention can be processed at comparatively low temperatures, the corresponding electrical functionalities being formed. Layers produced from the dispersions according to the invention can hence be produced in a simplified manner, the electrical properties of which are however not in the least impaired negatively.

The invention is explained subsequently with reference to an embodiment.

EMBODIMENT EXAMPLE

Reduction of Superficially Oxidised Silicon Nanoparticles

Silicon nanoparticles (size 30 nm+/−10 nm), independently of the oxidation state of their surface, are dispersed in a two-phase system, consisting of diluted aqueous hydrofluoric acid (e.g. 1% HF or another reagent which etches silicon oxide, such as hexafluorosilicic acid $H_2SiF_6$) and an organic solvent which is not miscible with water (e.g. chloroform, tetrachloromethane, other halogen alkanes or alternatively longer-chain alcohols i.e. length of the carbon chain: at least 4 C-atoms (butanol)). Oxidised particles preferably disperse in the aqueous phase and not in the organic phase. In the aqueous phase, the surface oxide layer is removed completely by the hydrofluoric acid and the surface is terminated with hydrogen atoms. The thus reduced particles disperse almost exclusively in the organic phase (target phase) and not in the aqueous phase (start phase). A continuous thorough mixing of both phases, e.g. by shaking, ultrasound or the like, and also slightly increased temperature (approx. 40° C.) accelerate the process so that the process takes place completely within a few minutes. The system remains in this state until further processing (e.g. film production). For further processing at a later time, the clear aqueous phase is removed and the dispersion of silicon nanoparticles in the organic solvent ("silicon ink") can be further used.

The invention claimed is:

1. A method for producing a dispersion of nanoparticles having an essentially oxide-free surface in an aqueous phase with the following steps:
   a) providing at least one, two-phase system comprising a first liquid phase, referred to as start phase, which is chosen such that nanoparticles having an at least partially oxidic surface can be dispersed and having a second liquid phase, referred to as target phase, which is not miscible with the start phase and is chosen such that nanoparticles having an essentially oxide-free surface can be dispersed, b) adding nanoparticles having an at least partially present oxidic surface, which disperse, as a function of the oxidation state of the surface in the start phase and/or the start- and target phase, c) adding a reducing agent which dissolves in the start phase so that the nanoparticles having an at least partially oxidic surface disperse after reduction in the target phase, the sequence of steps a), b), and c) being able to be chosen arbitrarily.

2. The method according to claim 1, wherein the reducing agent is contained already at least partially in the start phase in step a).

3. The method according to claim 2, wherein the nanoparticles are selected from nanoparticles of the elements silicon, germanium, aluminum, gallium, indium, copper, silver, gold, titanium, zinc, iron, cobalt, nickel, palladium, platinum or nanoparticles of compounds or alloys which comprise at least one of these elements.

4. The method according to claim 2, wherein the start phase is separated from the target phase which comprises the nanoparticles having an essentially oxide-free surface and the target phase is supplied for further use.

5. The method according to claim 2, wherein the nanoparticles have an average diameter of 2 nm to 5 µm.

6. The method according to claim 1, wherein the nanoparticles are selected from nanoparticles of the elements silicon, germanium, aluminum, gallium, indium, copper, silver, gold, titanium, zinc, iron, cobalt, nickel, palladium, platinum or nanoparticles of compounds or alloys which comprise at least one of these elements.

7. The method according to claim 1, wherein the start phase is separated from the target phase which comprises the nanoparticles having an essentially oxide-free surface and the target phase is supplied for further use.

8. The method according to claim 1, wherein the nanoparticles have an average diameter of 2 nm to 5 µm.

9. The method according to claim 1, wherein the at least partially oxidic surface of the nanoparticles was obtained intrinsically and/or artificially.

10. The method according to claim 1, wherein the start phase is selected from water, an aqueous phase or an organic solvent.

11. The method according to claim 10, wherein the organic solvents are selected from halogenated alkanes, long-chain linear or branched alcohols, or other solvents which are not miscible with aqueous phases.

12. The method of claim 11, wherein the halogenated alkanes are selected from the group consisting of chloroform and tetrachloromethane.

13. The method according to claim 1, wherein the target phase is selected from organic solvents, water or aqueous solvents which are not miscible with the start phase.

14. The method according to claim 1, wherein the reducing agent is selected from an acid or a base.

15. The method of claim 14, wherein the acid or base is selected from the group consisting of a hydrofluoric acid, a hexafluorosilicic acid, a hydrochloric acid, a potassium hydroxide solution, a sodium hydroxide solution and/or mixtures thereof.

16. The method according to claim 1, wherein the two-phase system is mixed thoroughly.

17. The method according to claim 16, wherein the mixing is effected by shaking, ultrasound, flow, agitation, heating and/or conducting through liquids or gases.

18. The method according to claim 1, wherein the two-phase system is heated in addition or is subjected to radiation or electrical fields.

19. A dispersion of nanoparticles having an essentially oxide-free surface in an aqueous phase, producible according to the method of claim 1.

20. A method of producing a liquid- or gaseous-liquid-processed electronic components comprising utilizing the dispersion according to claim 19.

* * * * *